Patented Jan. 21, 1930

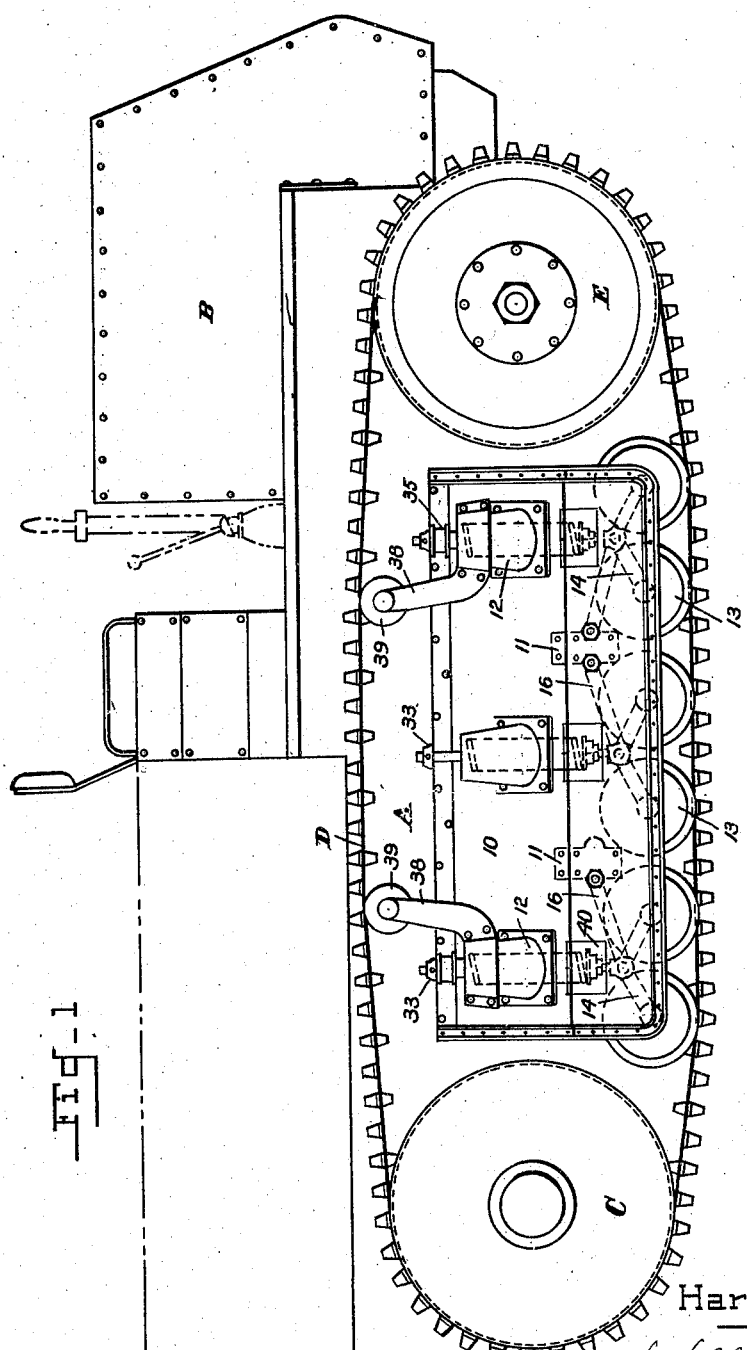

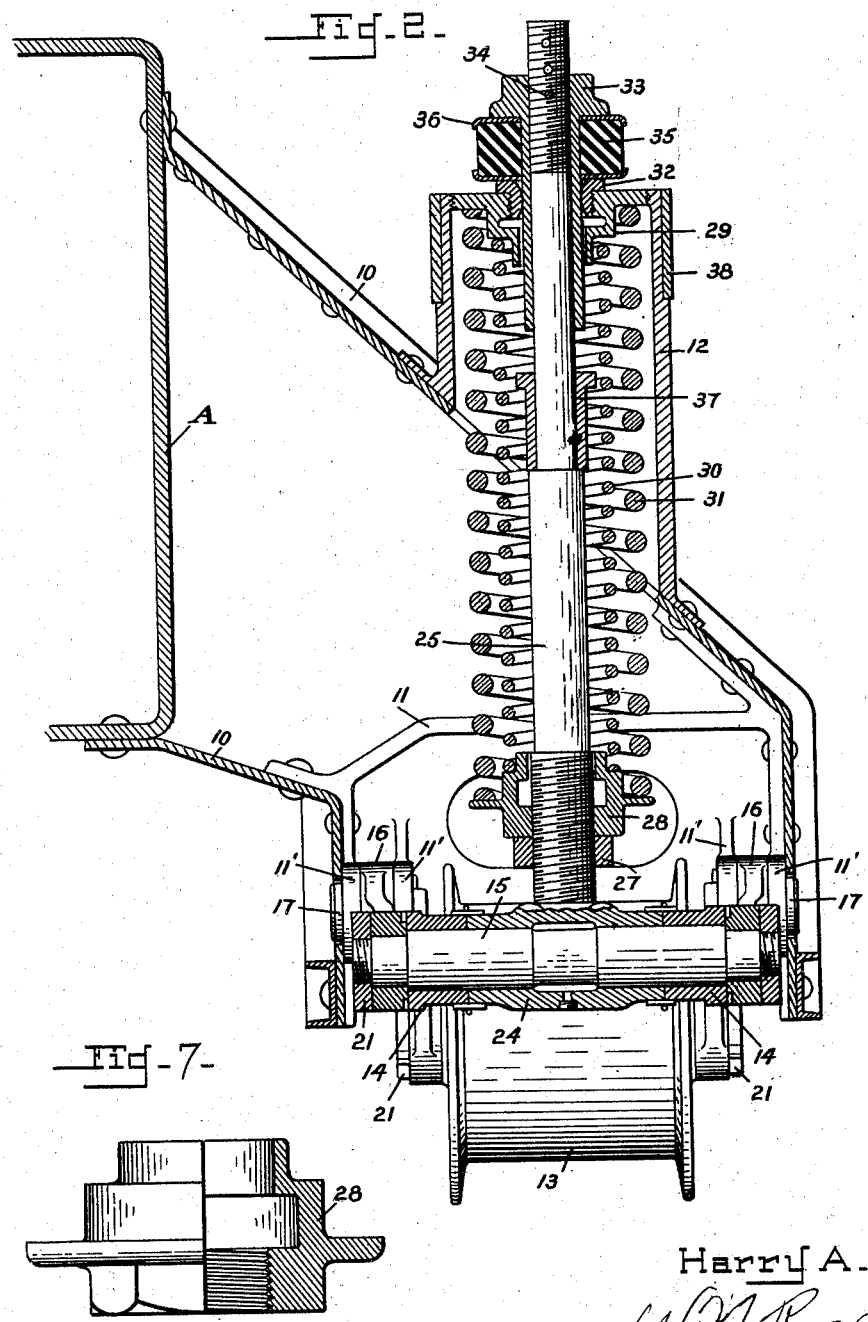

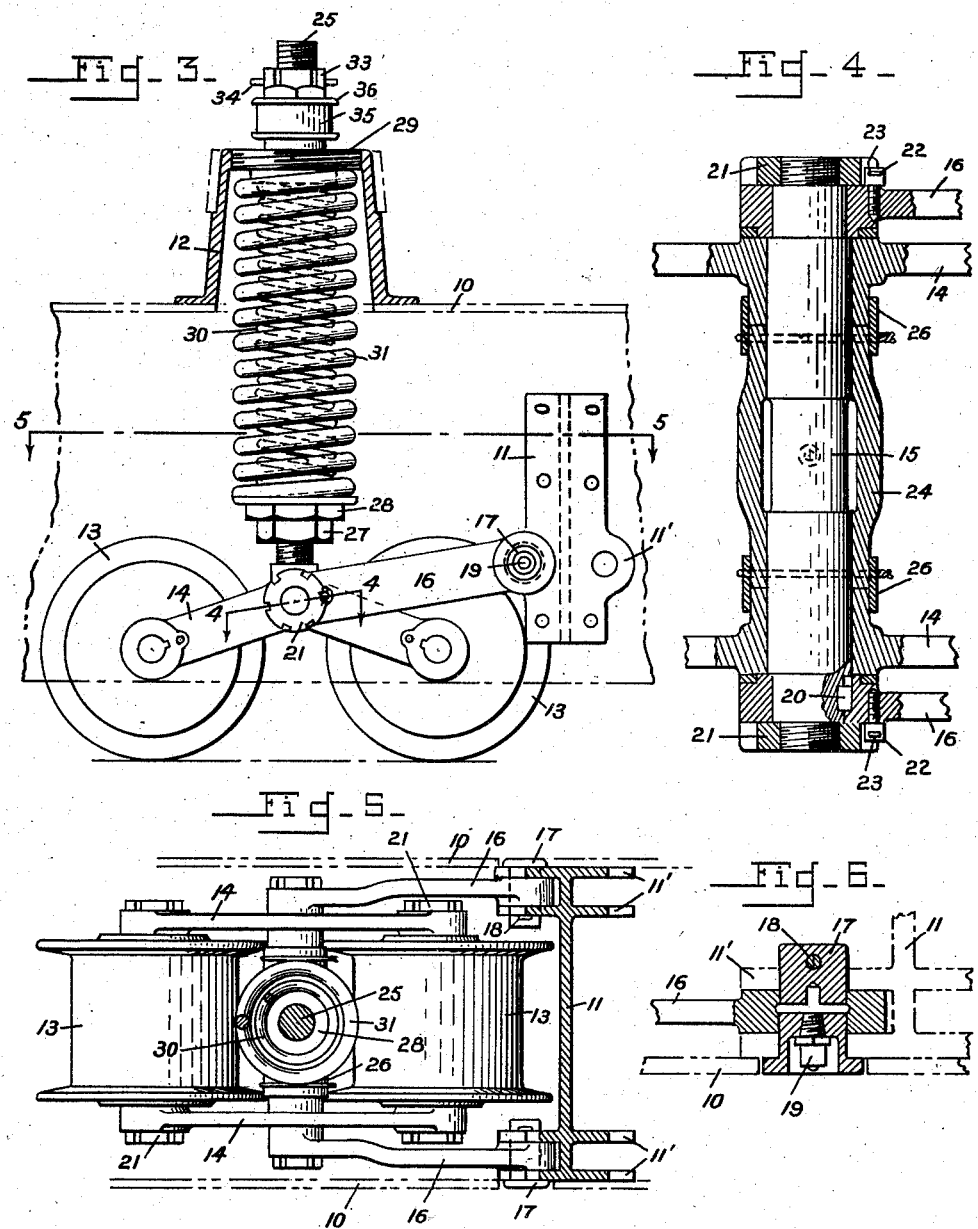

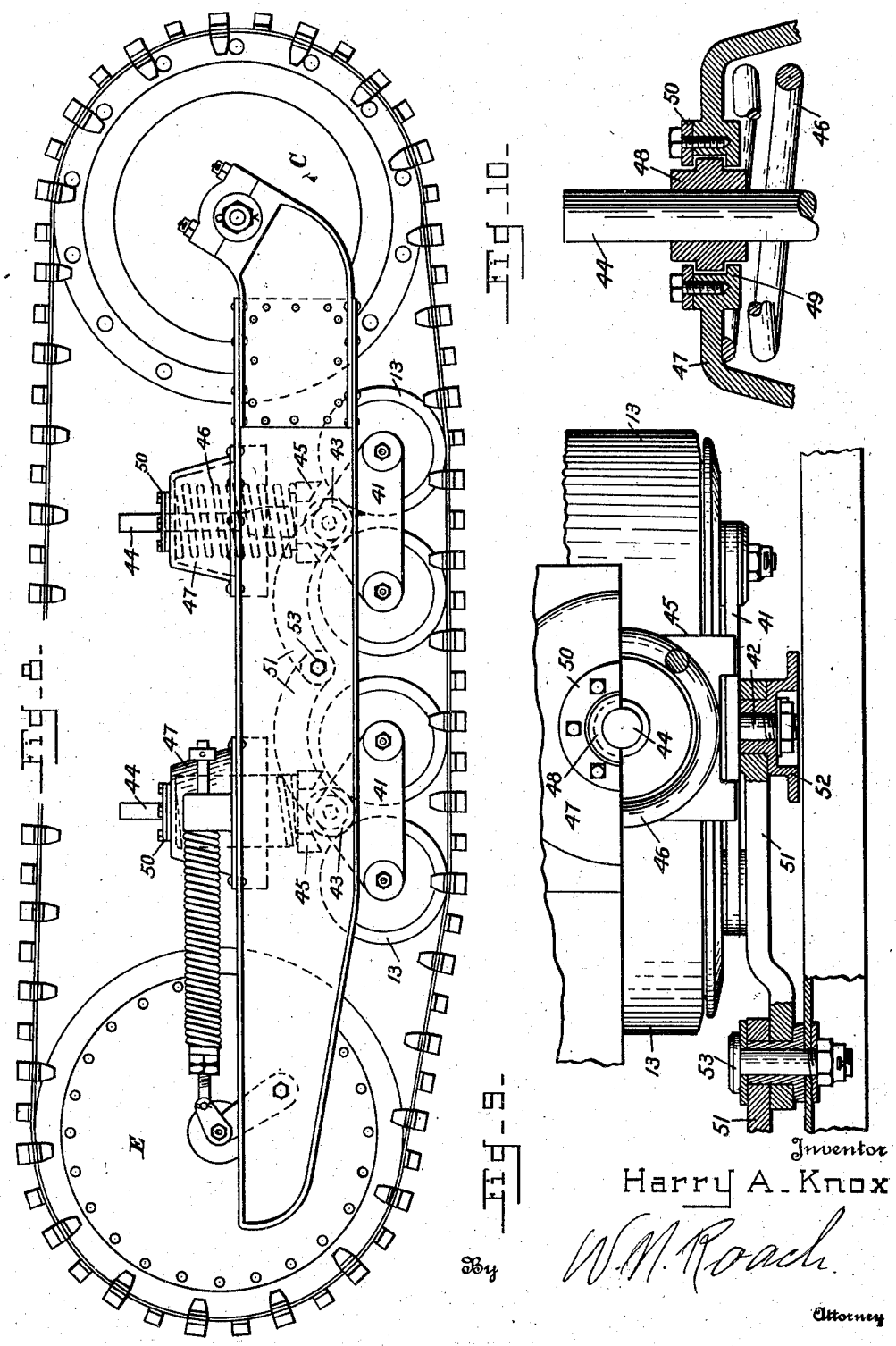

1,744,229

UNITED STATES PATENT OFFICE

HARRY A. KNOX, OF DAVENPORT, IOWA

SUSPENSION FOR TRACKLAYING VEHICLES

Application filed August 27, 1924. Serial No. 734,510.

(GRANTED UNDER THE ACT OF MARCH 3, 1883, AS AMENDED APRIL 30, 1928; 370 O. G. 757)

The invention described herein, if patented, may be manufactured and used by or for the Government for governmental purposes without the payment to me of any royalty thereon.

The subject of this invention is a suspension for track laying vehicles.

In vehicles of the track laying type the weight of the vehicle is supported on trucks, which carry wheels or rollers riding on a continuous rail formed by or on the inner side of an endless flexible track. The irregularities and obstructions in the path of travel entail considerable shock to the supporting rollers and to the vehicle.

In order that the rollers might conform to the contour of the ground over which the vehicle passes it has been customary to pivot the trucks to the frame or to each other so that each truck might be free to move in a substantially vertical plane against a yielding connection between the trucks and the main frame of the vehicle. To provide greater stability than the above structure was thought to afford it has also been proposed to omit one or more of the resilient connections and substitute therefor an equalizing bar extending underneath the frame to opposite trucks.

The object of the present invention is to provide a yielding suspension for track laying vehicles, designed to give a minimum amount of unsprung weight and which in addition to increasing stability will also increase flexibility. It is apparent that if all of the rollers of each truck unit are to follow the trail at all times it is necessary that the opposite and adjacent sets of rollers must be capable of independent vertical movement, as previously suggested, but more important, it is essential that the rollers of each individual unit be also capable of independent vertical movement or angular movement about a common center. This additional movement within as supporting unit insures maximum tractive contact with the ground at all times, eliminates unequal strains on the yielding connection to the frame, preserves the equilibrium of the tractor and distributes the weight through all of its supporting rollers equally.

The units of the supporting members being independently mounted receive and absorb their own individual stresses without receiving the strains or stresses from the adjoining units due to obstructions thereunder or to unusual weaving of the frame or other displacements.

It is evident that were the main frame to be mounted directly on the yielding connections the weaving and swaying of the frame would rapidly deform the connections and render the suspension inoperative. Consequently, the present invention further aims to provide a practical suspension in which a novel frame insures proper alignment of the rollers with the track and is prevented from distorting its yielding connections with the roller units by vertical pilot columns which project through the frame and which also carry idlers for supporting the upper run of the track.

Inasmuch as it is contemplated to use rubber-tired rollers which may require more frequent renewal the units may be separately removed from the frame and new units quickly substituted.

To these and other ends, my invention consists in the construction, arrangement, and combination of elements, described hereinafter and pointed out in the claims forming a part of this specification.

A practical embodiment of my invention is illustrated in the accompanying drawings, in which, Fig. 1 is a view in side elevation of a tractor constructed in accordance with the invention;

Fig. 2 is an enlarged transverse sectional view taken through a supporting unit;

Fig. 3 is a view in side elevation of a unit;

Fig. 4 is a sectional view taken on the line 4—4 of Fig. 3;

Fig. 5 is a sectional view taken on the line 5—5 of Fig. 3;

Fig. 6 is a detail sectional view of a link pivot;

Fig. 7 is a detail view partly in section of the spring supporting seat;

Fig. 8 is a view in side elevation showing the application of the supporting units to a conventional tractor frame;

Fig. 9 is a fragmentary plan view partly in section of a modified form of unit shown in Fig. 8; and Fig. 10 is a detailed sectional view of the upper end of the spring casing.

Referring to the drawings by characters and numerals of reference:

The vehicle consists of the usual main frame A carrying power a power plant B and having a suitable transmission to the drive sprocket C for driving a pair of endless tracks D about front idlers E.

Secured to each side of the main frame A and parallel therewith is a suspension or bogie frame consisting of spaced angular plates 10—10 conveniently reinforced by transverse plates 11 and having vertical casings 12 formed on or secured to the upper or outer frame at regular intervals.

The suspension frame is supported through yielding connections by a plurality of sets of rollers 13 arranged in series on each track, each set consisting of a pair of successive rollers mounted for either angular movement about their common axis or vertical movement and constituting an independent unit following the endless track for supporting the vehicle. As the units are essentially identical, only one will be described.

The rollers 13 are mounted on axles journaled in the opposite ends of a pair of bent arms 14. The arms are at their bent portion apertured and correspondingly flanged for rotatable mounting on a spindle 15.

On the outer ends of the spindle 15 are mounted links 16 which are supported on pivot pins 17 passing through parallel ears 11′ on the transverse plates 11 for the purpose of bracing each unit against lateral and longitudinal displacement. The pivot pins are held against removal by split pins 18 and may be provided with a lubricator 19 (see Fig. 6) for an obvious purpose.

The spindle bearing of each link is slotted to slide over a key 20 disposed in a slot in the spindle, sufficient clearance being maintained to permit relative rotational movement as the spindle is raised vertically and the links swung about their pivots. The links are of a length to describe a relative large arc so that considerable vertical movement of the spindle may be obtained without unduly oscillating the spindle and its attendant structure. The assembly is held to the spindle and axles by means of nuts 21 threaded thereon and locked in place by means of a screw 22, the head of which may be selectively disposed in a slot in the nut and held against removal by a cotter pin 23.

Embracing the central portion of the spindle is a sleeve 24 formed within an elongated pilot column 25 at right angles to the axis thereof and adapted to extend vertically through an opening in the head of the casing 12. The meeting ends of the sleeve and the annular flanges of the arms 14 may be surrounded by leather rings 26 to prevent dust and other foreign matter from entering the spindle. The lowermost portion of the pilot column 25 is threaded for the reception of an adjusting nut 27 and an annular seat 28, the seat being only threaded through a portion of its length to provide greater range of adjustment. Surrounding the column and confined between the seat 28 and the shaped head 29 of the vertical casing 12 are yielding elements, specifically an inner helical spring 30 and an outer spring 31, it being readily apparent that any desired number of springs may be used.

Threaded into the aperture of the casing is a cylindrical metal bearing 32, whose inner surface is rounded to establish a free pivot for the column as it is oscillated by the links 16 when an obstruction is encountered by the unit, resulting in an upward movement of the unit while the frame maintains an even keel. For this reason also the spring seat on the casing head is spaced from the sides of the column.

Threaded to the upper portion of the column is a sleeve 33 having a castellated head for receiving a locking pin 34, which may be selectively inserted through the column. Embracing the sleeve underneath its head is a bumper of any suitable type, specifically a resilient washer 35 confined between annular plates 36, whereby to yieldingly limit the downward movement of the column. It will be apparent that the springs 30 and 31 will cushion the upward movement of the column when a stop 37 on the column comes in contact with the lowermost portion of the spring seat in the casing head.

It has been found that it is only necessary to furnish bumpers for the end column although they may be provided on the intermediate columns, if desired. Similarly, there may be mounted on only the end casing 12, brackets 38 carrying rollers 39 for supporting the upper run of the track.

When encountering an obstruction, the front roller of each unit is free to be moved angularly upward to follow the obstruction, this movement swinging the bent arms about the spindle and causing either downward pressure or downward movement of the rear roller according to the nature of the obstruction. When the front roller passes over the crest of the obstruction the arms are free to swing in the opposite direction thereby reversing the direction of movement of the rollers and enabling each roller, at all times, to follow the track. When astride the obstruction both the rollers and their common axis are free to be moved upward to compress the spring and avoid disturbing the equilibrium of the vehicle.

It will also be apparent that irrespective of the divergent vertical movement of the individual rollers of a unit the yielding action of the spring will come into play whenever one unit is on a different plane from the remaining units, since the spring column of such unit is in constant vertical relation to the main frame.

The outer bogie frame 10 may be provided with apertures 40 or with doors to permit the insertion of a wrench for manipulating the nuts after assembly to adjust the suspension springs and regulate the keel of the vehicle for either operating under a maximum draw bar pull or with no trailed load.

In the modified form shown in Figures 8, 9, and 10, the rollers of a unit are mounted between the ends of two triangular plates 41, the apical portion of each plate being rotatably mounted on the end of a spindle 42. Centrally mounted on the spindle, is a sleeve 43 formed with a column 44 and having a seat 45 for a spring 46. The column projects through a casing 47 working in a metal bearing 48 which is loosely confined between an annular ledge 49 on the casing and a retaining ring 50.

The casing may be conveniently mounted on a popular type of suspension frame by spanning the parallel beams of the frame, thereby enabling the suspension units herein disclosed to replace the conventional trucks now in use.

The curved links 51 instead of being keyed to the spindle may be revolvably mounted on a hub cap 52 and the links of adjacent units may be supported from a common pivot 53.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A suspension for track laying vehicles, embodying a frame consisting of spaced angular plates, a vertically disposed casing on the upper plate, a supporting unit between the plates including a spindle, arms centrally pivoted on the spindle, rollers mounted at the extremities of the arms, a pilot column mounted on the spindle and projecting through the casing, springs surrounding the column and abutting the casing head, means for adjustably supporting the other ends of the springs, means for limiting vertical movement of the unit in either direction, and means for preventing lateral and longitudinal displacement of the unit.

2. A suspension for track-laying vehicles embodying a frame, an up-standing casing on said frame, a supporting unit for the frame including a spindle, a pair of successive rollers mounted for angular movement about the spindle as a common center, a pilot column mounted on the spindle and extending through the casing, yielding means interposed between the column and casing, means for limiting the vertical movement of the unit in either direction and means for preventing displacement of the unit.

3. A suspension for track-laying vehicles embodying a frame, a supporting unit for the frame including a spindle, a pair of successively mounted rollers movable angularly about the spindle, a pilot column mounted on the spindle, a yielding connection between the unit and frame, and a pair of links pivoted to the frame and loosely connected to the spindle, said links being of relatively great length to permit maximum vertical movement of the unit without undue oscillation.

4. A suspension for track-laying vehicles embodying a frame, a supporting unit for the frame including a spindle, a pair of successively mounted rollers movable angularly about the spindle, a pilot column mounted on the spindle, a yielding connection between the unit and frame, and a pair of links pivoted to the frame and loosely connected to the spindle.

5. A suspension for track laying vehicles embodying a frame; a supporting unit including a pilot column, a rockable track engaging element, and a pivotal connection between the pilot column and element to permit rocking movement of the latter; a yielding connection between the unit and frame, and means for bracing the unit against lateral and longitudinal displacement.

6. A suspension for track laying vehicles embodying a frame; a supporting unit including a pilot column, a track engaging element, and a connection between the pilot column and element to permit rocking movement of the latter; a yielding connection between the unit and frame and means for bracing the unit against lateral and longitudinal displacement, said means comprising a link connection between the unit and frame.

7. A suspension for track laying vehicles embodying a frame; a plurality of independent supporting units for the frame, each unit including a pilot column, a roller carrying element pivoted to the column for rocking movement, a plurality of successive rollers carried by the element; a yielding connection between each unit and frame, and means for bracing each unit against lateral and longitudinal displacement.

8. A suspension for track laying vehicles embodying a frame; a plurality of independent supporting units for the frame, each unit including a pilot column, a roller carrying element pivoted to the column for rocking movement, a plurality of successive rollers carried by the element; a yielding connection between each unit and the frame, and means for bracing each unit against lateral and longitudinal displacement, said means comprising a link connection between the unit and frame.

HARRY A. KNOX.